Figure 4:
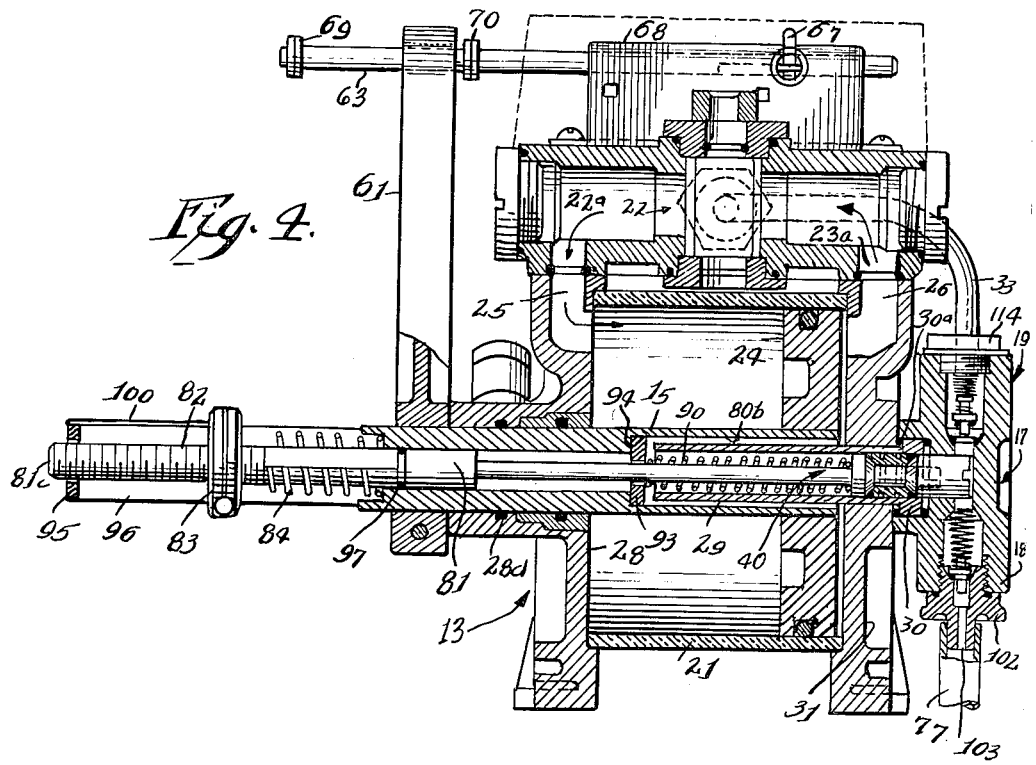

Oct. 26, 1965   N. CORDIS   3,213,796
VARIABLE PROPORTIONER
Filed Nov. 14, 1961   3 Sheets-Sheet 1
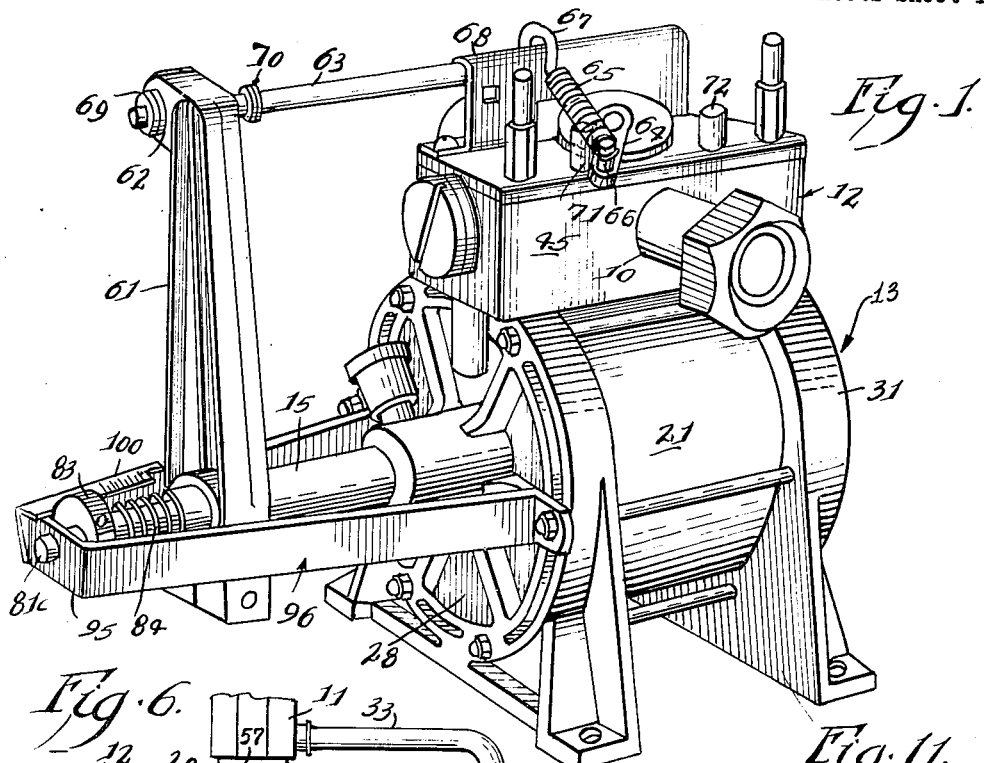
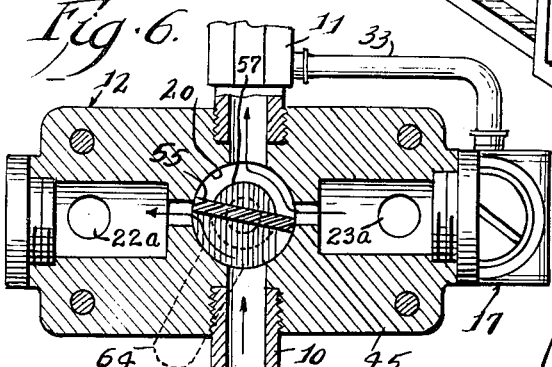
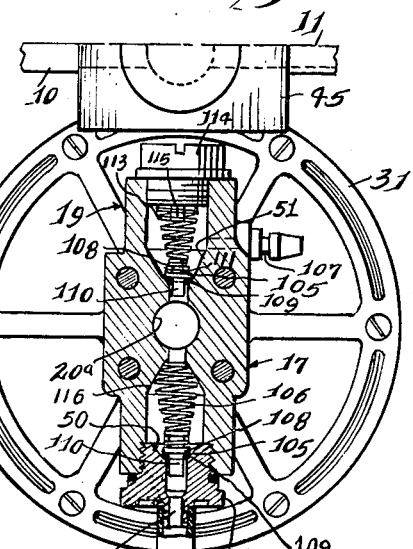
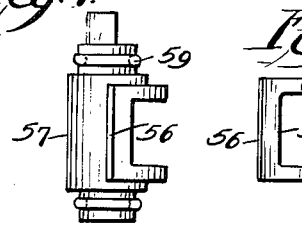
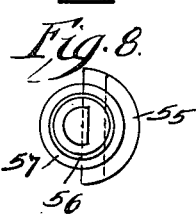
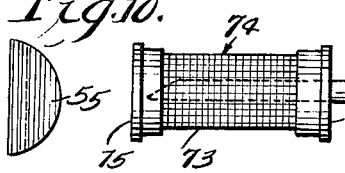
Inventor.
Nat Cordis.
Everett A. Johnson
By
Attorney.

Oct. 26, 1965 N. CORDIS 3,213,796
VARIABLE PROPORTIONER
Filed Nov. 14, 1961 3 Sheets-Sheet 2
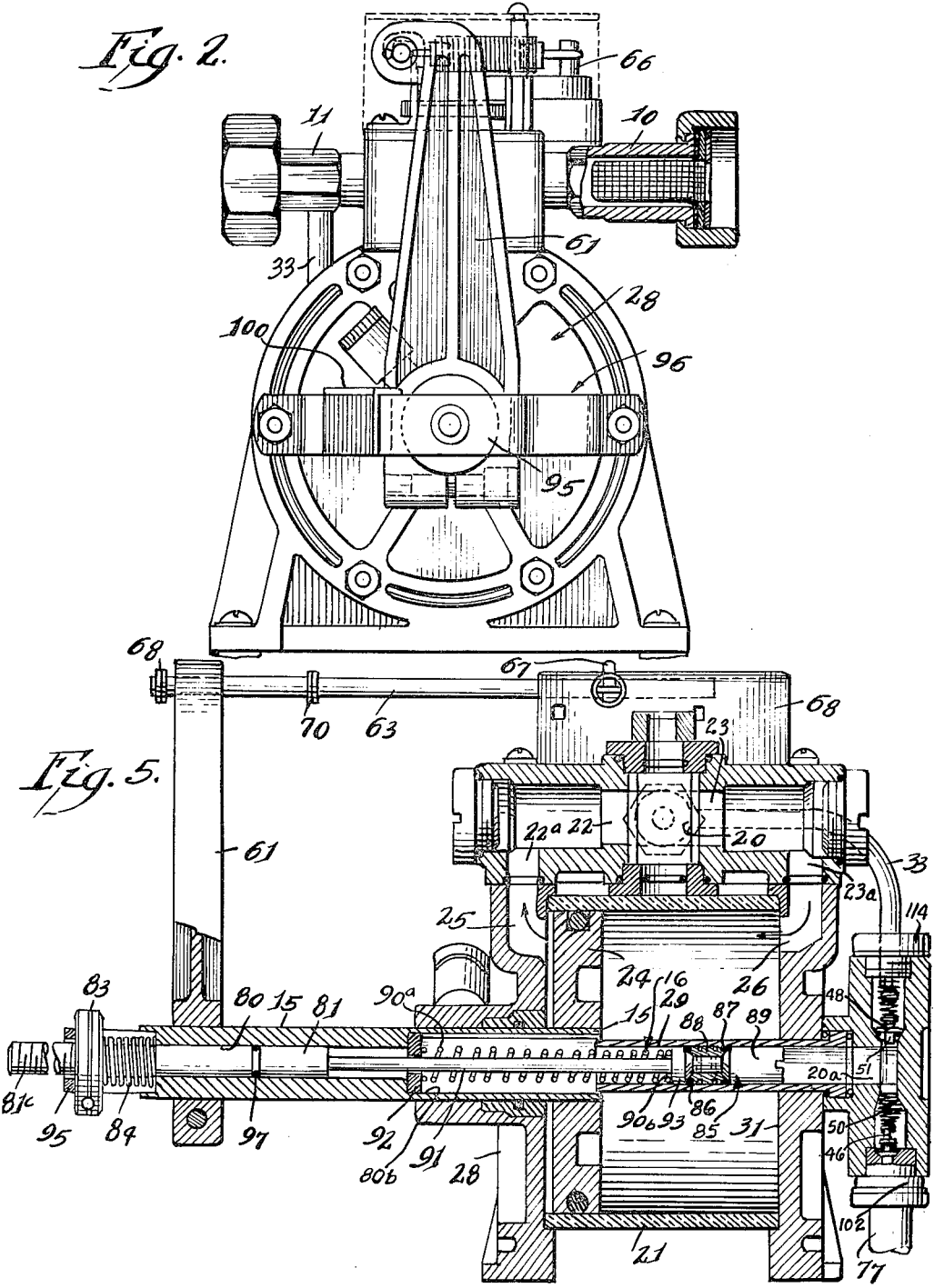

Oct. 26, 1965  N. CORDIS  3,213,796
VARIABLE PROPORTIONER
Filed Nov. 14, 1961  3 Sheets-Sheet 3

Inventor:
Nat Cordis.
By Everett A. Johnson
Attorney.

United States Patent Office 3,213,796
Patented Oct. 26, 1965

3,213,796
VARIABLE PROPORTIONER
Nat Cordis, Silver Lake, Wis.; Gladys S. Cordis, executrix of Nat Cordis, deceased, assignor of two-thirds to Carl F. Jensen, and one-third to Gerald T. Dobie, both of Crown Industries, Chicago, Ill.
Filed Nov. 14, 1961, Ser. No. 152,204
19 Claims. (Cl. 103—38)

This invention relates to a self-powered fluid proportioning apparatus of the variable type adapted for mixing a treating fluid with a raw fluid and discharging the fluids into a distribution means. More particularly, the invention relates to a system wherein a stream of water powers the apparatus as, for example, in medicating drinking water of livestock, including poultry.

Many types of equipment have heretofore been proposed for feeding into a first fluid stream, such as water, a second fluid, including drums, vaccines, nutrients, sanitizing, deodorizing, and softening materials and the like. Such prior systems, however, have been complicated in construction, unreliable in operation, cumbersome in use, not adapted for both portable and automatic continuous installation, have not been self-powered, nor variable.

A primary object of the invention is to provide a system for feeding a treating fluid into a first fluid in selected and variable proportions over a wide range of pressures and flow rates of the first fluid. Another object of the invention is to provide a system which requires no power for operating the apparatus other than the fluid stream being treated. An additional object of the invention is to provide an efficient and reliable device which is portable and rugged. It is a further object of the present invention to provide new and novel self-powered apparatus for continuously and automatically treating raw water streams with fluid treating agent or adjuvant. It is also an object of the invention to provide an apparatus particularly adapted for use in processing drinking water and for delivering the treated water under pressure into the water distribution system, such as a poultry watering system including drinking troughs having float-controlled inlet valves. A further object is to provide an apparatus for blending detergents with water for washing operations. These and other objects of the invention will become apparent as the description thereof proceeds.

Briefly, according to my present invention, I provide a self-propelled fluid blending or treating apparatus which includes a hydraulic master motor means operated by a primary raw fluid to be treated, a slave pump means for the treating fluid actuated by such motor, and a delivery means through which the fluid used to operate the motor and the treating fluid from the slave pump are commingled and discharged. Such delivery means may include a mixing chamber or manifold.

The slave pump and hydraulic motor comprise a unitary system wherein piston means in the hydraulic motor is provided with a cylindrical chamber reciprocatable along or over a fixed slave hollow pump plunger. The relative travel of the master piston in the fluid motor and the slave pump plunger is controlled by an adjustable linkage between the motor and the pump.

A pumping chamber having check valve means communicates with the fixed follow plunger and the treating agent and the water are discharged into the delivery manifold means wherein the fluids become intimately mixed.

Figure 3:
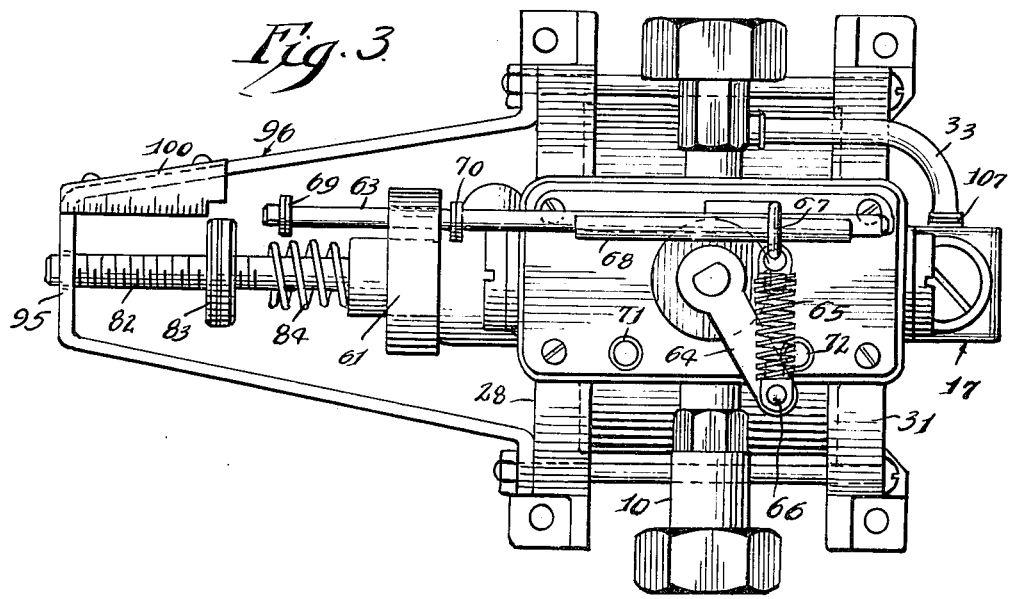

Details and advantages of the apparatus, in accordance with this invention, will be described by reference to the accompanying drawings wherein:

FIGURE 1 is an elevation in perspective;

FIGURE 2 and FIGURE 3 are opposite end elevations;
FIGURE 4 is a top view;
FIGURES 5 and 6 are elevations, partly in section;
FIGURES 7 through 10 illustrate details of the gating valve mechanism of FIGURES 5 and 6; and
FIGURE 11 is a fragmentary end view showing details of the slave pump valve means.

Referring to the drawings, the apparatus illustrated includes the water inlet 10, the water outlet 11, the water-gating assembly 12, the water motor 13, reset tappet means, connecting rod 15, slave pump 16, and treating agent valve chamber means 17 having inlet 18 and outlet 19.

The water enters the valve chamber 20 in the water-gating assembly 12 through line 10 and is gated into the motor body 21 alternately via ports 22 or 23 to apply fluid pressure on opposite sides of the motor piston 24 via channel 25 or 26. The slave pump 16 comprises a connecting rod 15 carried by the piston 24, rod 15 passing through one end wall 28 of the motor body 21. The tubular pump cylinder 29 is mounted by an end flange 30 in the opposite wall 31 of the motor body 21 and is provided with the O-ring gaskets 30a on both sides of the flange 30, as shown in FIGURES 4 and 5.

The slave pump valve means 17 fixed to the end wall 31 contains the inlet and outlet check valve assemblies 18 and 19, the inlet connection 32 and outlet channel 33. The piston 24 is driven by the water entering the gating system 12, 22, 23 and expelled by the piston 24 alternately through channels 42 and 43, shunt valve 55 and the manifold valve block 45 which discharges through outlet 11.

When the connecting rod 15 moves the plunger 40 away from the pumping tube means 29, treating fluid is drawn into the treating agent valve assembly 17 through the "open" inlet check valve 18 and at the same time the suction produced by the withdrawal of the plunger 40 within the hollow pumping tube 29 closes the outlet check valve 19, which when subsequently opened discharges through the tube 33 and line 11.

When the direction of travel of the pumping plunger 40 is reversed in following the motion of the motor piston 24 through the rigid connecting rod 15, the inlet check valve 18 closes and the outlet check valve 19 opens so that the treating fluid trapped in the pumping barrel 29a within pumping tube 29 is ejected by plunger 40 under pressure into outlet conduit 11 in the manifold 45 via channel 33. The water and medication are discharged in a proportion based upon the displacement volume of the slave pump 16 and the volume of the motor chamber 21 on either side of the motor piston 24.

If desired, a multiplicity of check valve-pump assemblies may be provided and actuated by the water motor 13. In this way several types of treating agents or additives may be blended with the water at the same time.

The pumping valve block 17 houses the inlet check valve 18 and the outlet valve 19. The inlet check valve 18 and the outlet check valve 19 comprise plug 46 and 48 held by springs 47 and 49 against the valve seats 50 and 51. A delivery tube 33 communicates with the valve block 17 above the spring-loaded plug 48 and discharges into the line 11.

The slave pump 16 includes the cylinder shaft 15 comprising the connecting rod for piston 24 with its axial bore and plunger 40. The treating fluid pumping tube 29 is tubular with an internal pumping channel 29a. On a suction stroke of the pumping plunger 40 the plug 46 of inlet check valve 18 lifts to open the port 18a; and the plug 48 on the outlet check valve 19 closes the outlet port 19a. When the pumping plunger 40 is on the ejection stroke, the situation is reversed so that the plug 48 is lifted and the plug 46 is positioned.

The gating system 12 includes a valve plug 55, the valve leaf spring 56, and the valve shaft 57 disposed within the valve chamber 20 in the valve block 45. These components are shown in detail and in subassembly by FIGURES 7 through 10 in the drawings. In FIGURE 6, the valve block 45 is shown in cross-section and illustrates the alternate positions of plug 55 and flows through the channeled block.

Opposite ends of the valve shaft 57 are provided with O-rings 59 and 60 to effect a fluid-tight seal. The valve plug 55 is shifted from two extreme positions, alternately closing and exposing the ports 22 and 23 leading to channels 22a and 23a, respectively, which direct the flowing fluid to opposite sides of the motor piston 24.

The connecting rod 15 projects through the end wall 28 and supports the actuating arm 61 which terminates at its upper end in a bore 62 through which the reversing rod 63 passes. A pair of C-rings 69 and 70 on the reversing rod 63 comprises travel stops contacted by the arm 61 for shuttling the reversing rod 63 between its positions.

The upper end of the valve shaft 57 is provided with a toggle lever 64 which is actuated by coil spring 65 anchored at one end to the post 66 carried by the free end of toggle lever 64, and is anchored at its other end by the inverted post 67 which is fixed to the shiftable reversing rod 63 which is slidably carried within the guide 68 secured to the valve block 20.

When the actuating arm 61 contacts either of the stops 69 or 70, the movement of the actuating arm 61 is imparted to the reversing rod 63 which in turn shifts the spring anchor post 67 with the result that the spring 65 swings about the post 66 carried by the toggle lever 64 until there has been sufficient travel thereof to shift the toggle lever 64 by the action of the spring 65. When this occurs, the valve shaft 57 is rotated and moves the valve plug 55 to a different diverting position. The travel or throw of the free end of the toggle lever 64 is controlled and restricted by posts 71 and 72 fixed to the valve block assembly 20.

As the piston 24 travels in the motor cylinder 21 the connecting rod 15 carries the actuating arm 61 with it causing the toggle lever 64 to pivot between the two positions determined by the posts 71 and 72. At the limits of travel of the reversing rod 63, the shunt valve 55 is placed in the alternate positions as shown in the drawings. This causes the water to course through the channels 22a or 23a leading to the opposite sides of the piston 24 thereby displacing the piston 24 to opposite ends of the motor cylinder 21 and actuating the slave pump 16 as described.

The illustrated embodiment of the invention includes the screen, the washer, and the pressure-responsive flow restricter in the inlet 10, but these may be omitted as unnecessary with clean fluid and moderate flow pressure.

The motor piston 24 within motor cylinder 21 has tubular connecting rod 15 fixed to it and projecting axially of end wall 28. The connecting rod 15 contains bore 80 accommodating the adjustable shaft 81, which includes the threaded portion 81c, the adjustment nut 83, the balancing spring 84 about the shaft 81, the slave pump plunger head 85 having O-rings 86 and 87, the expandable chevron seal 88, and threaded end plug 89. The spring 90, arranged about the constricted portion 91 of the shaft 81, has one end 90a abutting the plunger shoulder 93 and the other end 90b acting against collar 92 floating on the shaft 81 to abut shoulder 94 within the bore 80 in propelling slave plunger head 85 after compressing spring 90. The slave pump plunger 85 operates within the cantilever-mounted slave pumping barrel 29 which is extendable within the chamber 80b. The adjustment of these components determines the time lag in the operation of the slave pump in relation to the travel of the piston 24.

The exposed end 81c of the shaft 81 has its threaded portion 82 extending through stop yoke 95, forming part of the bracket 96 fixed to the end plate 28 of the motor housing 21. Adjusting proportioning nut 83 in one extreme of its travel abuts the stop yoke 95 which is the minimum or decreased proportion position.

Moving the proportioning nut 83 outwardly of the end 81c of the shaft 81 decreases the proportion delivered by the slave pump 16, and positioning the proportioning nut 83 inwardly of the yoke 95, to contact spring 84, increases the quantity of the fluid delivered by the slave pump 16; in these adjustments the lengths of springs 84 and 90 are altered whereby the effect of movement of the piston 24 necessary to actuate the slave plunger 40 in suction and delivery strokes is correspondingly altered.

The shaft 81 within the bore 80 in the connecting rod 15 is fluid-sealed by an "O" ring 97. The hollow shaft or rod 15 with its cylindrical chambers 80a, 80b and 80c accommodating the spring 90, the shaft 81 having threaded portion 82 on which the proportioning nut 83 runs and axially adjusts the delayed projection and retraction of the slave plunger, when taken together comprise an adjustable connecting rod means by which the motion of the motor piston 24 is imparted to the slave plunger head 85 relative to the cantilever pump barrel 29 which is axially aligned with the connecting rod means and reciprocates therewith.

A proportioning scale 100 may be carried by the bracket 96 with indicia 101 thereon correlated with the settings of the proportioning nut 83, whereby the selected proportions of raw power fluid, such as water, and of the treating fluid delivered by the slave pump 16 are selected and blended.

Thus I have provided a system for treating or blending fluids in selected variable proportions. The apparatus includes a fluid motor comprising a cylinder, a piston, a piston connecting rod means for power take-off, and a fluid gating means in combination with a slave pump means comprising a treating fluid valving means, a slave pump barrel projecting axially inward of the motor cylinder, a variable stroke slave plunger means carried within the hollow connecting rod means and operating within the slave pump barrel which communicates with the treating fluid valving means. Slave plunger adjusting means is provided exterior of the motor housing whereby the proportions of raw fluid and treating fluid blended therewith can be varied even during operation of the device.

A novel check valve assembly 17, shown in detail by FIGURES 4 and 11, includes a valve block 29, a lower inlet poppet valve plug 46, a lower valve screw cap 102 having an inlet channel 103 and a plug seat 50. The inlet check valve 18 includes a plug 46 having a body portion 105 and a tapered spring 106 extending between the plug 46 and tapered bore 116. A transverse chamber 20a comprises an extension of the pumping channel 29a in the tube means 29 and the plug 89 on the end of the plunger 40 projects into chamber 20a on each ejection stroke to displace all fluids from the block 20 through the outlet check valve 19 and discharge them via nipple 107, tubing 33 and delivery line 11.

The upper end of the discharge valve cavity 113 is closed by screw cap 114 having an axial inward projection 115. Outlet poppet plug 48 comprises a body portion 105 having an upper axial projection 108, an O-ring seal 109, and a depending guide stem 110. A tapered spring 111 engages the axial projections 115 and 108 and urges the O-ring 109 on plug 48 against the tapered seat 51. The lower inlet poppet valve plug 46 comprises corresponding components; however, the normally closed check valves 18 and 19 are in opposed array so that the inlet valve 18 opens on the suction stroke and the outlet valve 19 opens on the delivery stroke.

In operation, the intake assembly 73 connected to the inlet end of the conduit 77 is placed within a vessel containing the treating agent. The assembly 73 includes a cylindrical strainer screen 74 and two end plates 75 and 76, one of which is provided with a port to receive the tubing or conduit 77. The assembly may be weighted with a ball-bearing or the like so as to assure that the inlet end of the conduit 77 remains near the bottom of the vessel.

The invention as described discharges mixed fluids from the conduit 11. If desired, an auxiliary mixing chamber (not shown) may be provided but ordinarily this is not necessary, the proportioner providing adequate agitation and mixing of fluids.

The drawings accompanying this specification show numerous details of construction which have not been designated by individual reference numerals. However, it will be apparent to one skilled in the art that these details include such items as grease cups, hose connectors, screws, valve block plugs, O-rings and the like. The end plates 28 and 31 are provided with feet 78, but it is contemplated that screws or bolts may be substituted for securing the apparatus to a base (not shown).

Materials of construction will be selected to be compatible with the fluids. For example, with corrosive treating agents we may use a nylon pumping plunger head 85 in a glass or stainless steel sleeve 40 as the pumping tube, and the check valve assemblies 18 and 19 in block 17 may be of plastic or stainless steel. Other metals provided with ceramic or plastic coatings may also be used.

Although I have described the invention with particular reference to a preferred embodiment thereof, it should be understood that this is by way of illustration only and that modifications therein may be made in view of the teachings, without departing from the spirit and scope of the invention.

What I claim is:

1. A variable treater device for commingling first and second fluids which comprises a first cylinder, alternate fluid supply channels leading to and from said cylinder, a first piston means operable in said first cylinder, a second cylinder in said piston means, cantilever pumping tube means extendable within said second cylinder when said first piston means is reciprocated, variable slave plunger means carried by said first piston means and working within said tube means, a stroke regulating connection between the first piston and said slave plunger, said slave plunger means being actuated through adjustably varying strokes in accordance with the setting of said stroke regulating connection, dual check valve means in communication with said tube means, said check valve means providing an inlet and an outlet for the second fluid to and from said tube means, flow control means gating the first fluid into said first cylinder alternately on opposite sides of said first piston, and shift means actuated by said first piston means to position said flow control means.

2. The device of claim 1 which includes connecting rod means in said first piston means and wherein said shift means comprises a toggle arm, reversing rod means actuated by said connecting rod means fixed to said piston means, and spring means linking said toggle arm and said reversing rod.

3. The device of claim 1 wherein the flow control means comprises a rotatable plug member exposing said alternate fluid supply channels.

4. The device of claim 1 wherein said shift means comprises a spring-loaded toggle arm, said arm actuating said flow control means.

5. A portable variable self-powered treating fluid dispenser for use with water systems which comprises in combination, water supply conduit means, dispacement hydraulic motor means into which said supply conduit means discharges, a slave displacement pump means including a cantilever pumping barrel, said slave pump means and said motor means having outlet conduit means discharging into a single delivery conduit means, master piston means in said motor means, said master piston means comprising a minor portion of the total volume of said motor means, slave plunger means operating in said pumping barrel, said slave plunger means being reciprocated by said master piston means to produce pumping action within said pumping barrel, and adjustable telescoping connector means between said master piston means and said slave plunger means, whereby the relative proportions of the water and treating fluid discharging into said delivery conduit means from said dispenser may be varied.

6. A variable proportioner comprising a master hydraulic motor means including a first piston, slave pump means driven by said motor means and including a fixed cantilever barrel, said barrel being fixed at one end and having a central elongated channel of smaller displacement than said motor means, connecting rod means carried by said first piston means, variable plunger means extending from said connecting rod means, said connecting rod means being formed with a barrel receiving portion therein, gating valve means for directing a first fluid through said master motor means, opposed check valve means exterior of said motor for controlling a second fluid through said slave pump means, delivery conduit means into which a proportioned mixture of first and second fluids is discharged from said master motor and said slave pump, and toggle means actuating said gating valve means.

7. Variable proportioner apparatus comprising reciprocating slave pump means, a pressure operated hydraulic motor, said motor comprising a piston movable within a chamber, and connecting rod means propelled by said piston to actuate said reciprocating slave pump means, said connecting rod means including adjustable-stroke, spring-loaded slave pumping plunger means, said pumping plunger means telescoping within said connecting rod means, a spring interposed said plunger and said connecting rod means, conduit means for delivering a first liquid under pressure to said motor, second conduit means for discharging liquid from said motor, the said reciprocating slave pump means including a tubular pump barrel means and said adjustable-stroke pumping plunger, a second barrel in said connecting rod means within which said pump barrel is extendable, first check valve means controlling flow of a second liquid into said slave pump means, second check valve means controlling flow from said pump means, and delivery conduit means into which said second conduit means and said second check valve means discharge proportioned first and second liquids.

8. A self-powered apparatus for blending two fluids in selected variable proportions which comprises a master hydraulic motor means driven by a first fluid, slave pump means for a second fluid, said slave pump means including a first tubular pump chamber, a pair of opposed check valves comprising the inlet and outlet of said chamber, said master hydraulic motor means comprising a first piston, a connecting rod means carried by said first piston, said connecting rod means including a cylindrical chamber within said rod, said tubular pump chamber being extendable within said cylindrical chamber, and adjustable-stroke plunger means carried by said connecting rod and operating within said pump chamber, whereby movement of said first piston and said connecting rod means including said plunger produces a pumping action within said tubular fixed barrel, and delivery conduit means connected to said hydraulic motor means and into which fluids from said motor means and from said slave pump means are discharged to commingle in the desired variable proportions.

9. The apparatus of claim 8 which includes valve means gating the first fluid through said motor means and toggle means actuated by said connecting rod means, said toggle means being operatively engaged with said valve means and including a coil spring, a reversing rod means, said coil spring being anchored to said reversing rod means and to the free end of said toggle arm, and actuating means for said reversing rod means carried by said connecting rod.

10. A self-powered variable fluid proportioner including a hydraulic motor having a housing, a piston, a connecting rod means, and power fluid gating means controlled by said connecting rod means, said connecting rod means comprising a tubular member, a slave pump plunger extendable from within said tubular member, coil spring means about a portion of said plunger and urging said plunger outwardly of said tubular member, a cantilever-mounted slave pumping cylinder projecting inwardly of said housing and extendable into said tubular member, said slave pump plunger operating within said cantilever pumping cylinder, a slave pump valving means including a chamber arranged transverse to said pumping cylinder and having an inlet valve and an outlet valve, an end portion of said slave pump plunger being extendable from said slave pumping cylinder into said valve chamber between said inlet and outlet valves to expel substantially all fluids therefrom in the delivery stroke.

11. A self-powered fluid proportioner comprising master motor and slave pump means which provides means for varying the effective capacity of said slave pump, a tubular chamber in a connecting rod carried by a motor piston in said master motor, said slave pump including a cantilever pumping barrel in axial alignment with said connecting rod and extending axially inward of said master motor, a slave pump valve chamber in fluid communication with said pumping barrel, spring-loaded pumping plunger means adjustably disposed within said tubular chamber in said connecting rod and projecting through said pumping barrel, a plunger head on said plunger means, operation of said motor causing said plunger means to reciprocate within said barrel in a suction and in a delivery stroke, the said plunger head extending through the fixed end of said pumping barrel into said slave pump valve chamber to eject substantially all of the second fluid therefrom.

12. A variable proportioner device for treating fluids which comprises a first cylinder, a first piston means operable within said first cylinder, said first piston means including a tubular connecting rod fixed to the first piston, a second cylinder in said connecting rod, cantilever pumping tube means within said first cylinder and extendable within said second cylinder, plunger means carried by said first piston and working within said pumping tube means, means providing a variable lost motion connection between said first piston and said plunger, valving chamber exterior of said first cylinder and in communication with said pumping tube means, check valve means providing an inlet and an outlet for said valving chamber, flow control means gating the first fluid into said first cylinder alternately on opposite sides of said first piston, and shift means actuated by said first piston means positioning said flow control means.

13. The device of claim 12 wherein said shift means comprises a toggle arm, reversing rod means actuated by said first piston means, and spring means linking said toggle arm and said reversing rod means.

14. The device of claim 12 wherein said flow control means comprises a rotatable plug member exposing alternate fluid supply channels to operate said motor means.

15. The device of claim 12 wherein said plunger means extends on each delivery stroke into said valving chamber whereby substantially all fluids are expelled therefrom.

16. The device of claim 12 wherein said plunger means includes a threaded shaft, normally extended coil spring means on said shaft, and adjustable stop nut means on said shaft whereby the length of plunger travel may be varied.

17. The device of claim 16 wherein said spring means includes a pair of coil springs, a shiftable washer on said shaft and a fixed shoulder within said second cylinder and with which said washer cooperates to compress one of said springs to provide the lost motion delay before said connecting rod drives said plunger.

18. The device of claim 12 wherein the valving chamber comprises a valve block, an inlet port and an outlet port in axial alignment and disposed at opposite ends of said block, a pumping chamber in said block intermediate said ports, a first flow control plug between said inlet port and said chamber, and a second flow control plug downstream of said outlet in said block, each of said plugs being spring-loaded and having an "O"-ring thereon forming seals with said ports, said pumping chamber being in axial alignment with and comprising an extension of said pumping tube means into which said plunger means projects between said inlet and outlet ports.

19. The flow control of claim 18 wherein each of said plugs is generally spindle-shaped, an "O"-ring being on a lower projection of each and including compression spring means acting on an upper projection of each to position both "O" rings and plugs in normally port-closing position.

References Cited by the Examiner

UNITED STATES PATENTS

| | | | |
|---|---|---|---|
| 859,961 | 7/07 | Meier | 91—347 |
| 883,972 | 4/08 | Rose | 91—347 |
| 1,053,032 | 2/13 | Harris | 91—347 |
| 1,661,466 | 3/28 | Cook | 91—347 |
| 1,766,010 | 6/30 | Binderup | 91—347 |
| 1,974,556 | 9/34 | Ainsworth | 60—54.6 |
| 1,978,667 | 10/34 | Breese | 60—54.6 |
| 2,191,458 | 2/40 | Duden | 103—153 |
| 2,367,893 | 1/45 | Sheen | 103—153 |
| 2,390,762 | 12/45 | Woelfer | 103—48 |
| 2,559,659 | 7/51 | Redman | 103—153 |
| 2,612,143 | 9/52 | Weis | 91—347 |
| 2,658,485 | 11/53 | Dreyer | 91—347 |
| 2,707,485 | 5/55 | Saalfrank | 103—230 |
| 2,862,478 | 12/58 | Staats | 103—50 X |

LAURENCE V. EFNER, *Primary Examiner.*